(12) United States Patent
Ramanujan et al.

(10) Patent No.: US 11,609,811 B2
(45) Date of Patent: Mar. 21, 2023

(54) AUTOMATIC ROOT CAUSE ANALYSIS AND PREDICTION FOR A LARGE DYNAMIC PROCESS EXECUTION SYSTEM

(71) Applicant: Microsoft Technology Licensing, LLC, Redmond, WA (US)

(72) Inventors: Sanjay Ramanujan, Sammamish, WA (US); Andrew Tianze Wang, Potomac, MD (US); Marwan Elias Jubran, Kirkland, WA (US); Weiping Hu, Bellevue, WA (US); Xiaoguang Fan, Kirkland, WA (US)

(73) Assignee: MICROSOFT TECHNOLOGY LICENSING, LLC

( * ) Notice: Subject to any disclaimer, the term of this patent is extended or adjusted under 35 U.S.C. 154(b) by 169 days.

(21) Appl. No.: 17/004,566

(22) Filed: Aug. 27, 2020

(65) Prior Publication Data
US 2022/0066852 A1    Mar. 3, 2022

(51) Int. Cl.
*G06F 11/00* (2006.01)
*G06F 11/07* (2006.01)
*G06F 9/48* (2006.01)

(52) U.S. Cl.
CPC .......... *G06F 11/079* (2013.01); *G06F 9/4881* (2013.01); *G06F 11/0721* (2013.01); *G06F 11/0793* (2013.01)

(58) Field of Classification Search
CPC .............. G06F 11/079; G06F 11/0721; G06F 11/0793; G06F 9/4881
USPC ....................................................... 714/1–57
See application file for complete search history.

(56) References Cited

U.S. PATENT DOCUMENTS

| | | | |
|---|---|---|---|
| 10,270,796 B1* | 4/2019 | Veeraswamy | H04L 63/1433 |
| 2005/0096953 A1* | 5/2005 | Washington | G06Q 10/06395 |
| | | | 705/7.41 |
| 2009/0228408 A1* | 9/2009 | Kaushal | G06N 5/04 |
| | | | 714/26 |
| 2010/0257538 A1* | 10/2010 | Zhao | G06F 9/5066 |
| | | | 712/220 |

(Continued)

OTHER PUBLICATIONS

"International Search Report and Written Opinion Issued in PCT Application No. PCT/US21/032839", dated Nov. 5, 2021, 17 Pages.

*Primary Examiner* — Sarai E Butler
(74) *Attorney, Agent, or Firm* — Ray Quinney & Nebeker; Tiffany Healy

(57) ABSTRACT

An automated root-cause analysis (RCA) system may provide a fully automated platform that provides dependency and execution order modeling for tasks included in a capacity provisioning process, anomaly detection, ticket correlation, root-cause analysis, monitoring and feedback, and data visualization. The automated RCA system may continuously collect and store data for use in determining a root cause of a blockage on a capacity provisioning process. The blockage may be identified in a ticket generated by a cloud-computing system. The automated RCA system may receive the ticket and attempt to determine the root cause of the blockage based on root causes associated with previous tickets generated by the cloud-computing system. The automated RCA system may identify a true root cause, recommend repair items based on the true root cause, identify one or more responsible teams to drive a fix, and provide an estimated time for completion.

20 Claims, 6 Drawing Sheets

(56) References Cited

U.S. PATENT DOCUMENTS

| | | | |
|---|---|---|---|
| 2011/0231704 A1* | 9/2011 | Ge | H04L 41/0631 |
| | | | 714/E11.029 |
| 2012/0198253 A1* | 8/2012 | Kato | H02J 3/14 |
| | | | 713/320 |
| 2015/0302319 A1* | 10/2015 | Elder | G06Q 50/06 |
| | | | 700/291 |
| 2016/0170848 A1* | 6/2016 | Yang | G06F 11/1484 |
| | | | 714/4.12 |
| 2016/0378583 A1* | 12/2016 | Nakano | G06F 11/0751 |
| | | | 714/37 |
| 2017/0140315 A1 | 5/2017 | Cao et al. | |
| 2017/0294112 A1* | 10/2017 | Kushnir | G08B 29/02 |
| 2018/0115469 A1* | 4/2018 | Erickson | H04L 43/026 |
| 2019/0220321 A1* | 7/2019 | Yang | H04L 41/12 |
| 2019/0280945 A1* | 9/2019 | Liu | H04L 29/08 |
| 2019/0347282 A1 | 11/2019 | Cai et al. | |
| 2020/0084087 A1* | 3/2020 | Sharma | H04W 24/04 |
| 2020/0174870 A1* | 6/2020 | Xu | G06F 11/0784 |
| 2021/0081347 A1* | 3/2021 | Liao | G06F 9/5066 |
| 2021/0286798 A1* | 9/2021 | Li | G06F 16/168 |
| 2021/0342184 A1* | 11/2021 | Liu | G06F 9/4881 |
| 2022/0053312 A1* | 2/2022 | Yin | H04W 8/08 |

* cited by examiner

AUTOMATIC ROOT CAUSE ANALYSIS AND PREDICTION FOR A LARGE DYNAMIC PROCESS EXECUTION SYSTEM

CROSS-REFERENCE TO RELATED APPLICATIONS

N/A

BACKGROUND

A cloud-computing system may refer to a collection of computing devices or resources that can be accessed remotely. Stated another way, cloud computing may be described as the delivery of computing services (such as storage, databases, networking, software, applications, processing, or analytics) over the Internet. Clients may access a cloud-computing system through a client device. The cloud-computing system may include resources that provide services to clients. These resources may include processors, memory, storage, and networking hardware.

A cloud-computing system may include a number of data centers that may be located in different geographic locations. Each data center may include many servers. A server may be a physical computer system. The cloud-computing system may run virtual machines on a server. A virtual machine may be a program that emulates a distinct computer system but that can run on a server with other virtual machines. Like a physical computer, a virtual machine may include an operating system and applications.

A cloud-computing system may make the virtual machines available to customers to host and execute their workloads in a timely manner. As customer needs evolve and grow, the cloud-computing system may need to construct new data centers or modify existing ones in order to match capacity demands. Increasing the capacity of a cloud-computing system may be referred to as capacity provisioning. Capacity provisioning may be accomplished through an automated provisioning process that requires executing a set of tasks, some of which have dependencies upon other tasks and other cloud-computing system sub-systems. In part due to these dependencies, an individual task may fail to complete in a timely manner. When a task is blocked, the cloud-computing system may create a ticket to alert operations of the blockage. The ticket may not, however, identify a cause of the blockage. Many man hours may be required to investigate and determine the root cause, identify repairs, and assign the repairs to the correct team(s).

SUMMARY

In accordance with one aspect of the present disclosure, a system is disclosed for automatically determining a root cause of a failure associated with a capacity provisioning process in a cloud-computing system. The system includes one or more processors, memory in electronic communication with the one or more processors, and a data store. The data store includes historical tickets and root-cause records associated with one or more of the historical tickets. The system also includes instructions stored in the memory. The instructions are executable by the one or more processors to receive events emitted by tasks associated with the capacity provisioning process. The events describe a status of the tasks. The instructions are also executable by the one or more processors to receive health signals from one or more external systems. The health signals indicate whether the one or more external systems are operational. The instructions are also executable by the one or more processors to receive a ticket. The ticket identifies the failure associated with the capacity provisioning process. The instructions are also executable by the one or more processors to determine the root cause of the failure based on the events, the health signals, the historical tickets, and the root-cause records. Determining the root cause of the failure includes pattern-matching the ticket against the historical tickets. The instructions are also executable by the one or more processors to associate the root cause of the failure with the ticket and provide the root cause of the failure to operations.

The instructions to determine the root cause of the failure based on the events, the health signals, the historical tickets, and the root-cause records may include instructions executable by the one or more processors to identify a matching ticket among the historical tickets. The matching ticket has one or more similarities to the ticket. The instructions may also be executable by the one or more processors to identify a root-cause record associated with the matching ticket. The root-cause record associated with the matching ticket may identify a root cause of the matching ticket. The instructions may also be executable by the one or more processors to determine the root cause of the failure based in part on the root-cause record associated with the matching ticket.

The instructions may be further executable by the one or more processors to identify additional matching tickets among the historical tickets. The additional matching tickets may have one or more similarities to the ticket. The instructions may also be further executable by the one or more processors to identify one or more root-cause records associated with the additional matching tickets. The one or more root cause records associated with the additional matching tickets may identify root causes for the additional matching tickets. The instructions may also be further executable by the one or more processors to prune the one or more root-cause records based on time and spatial correlation.

The instructions to identify the matching ticket among the historical tickets may include instructions executable by the one or more processors to identify the matching ticket among the historical tickets using a machine-learning engine.

The instructions may be further executable by the one or more processors to determine repairs for the failure based on the root-cause record associated with the matching ticket, identify one or more repair teams for the repairs, and provide the root cause of the failure and the repairs to the one or more repair teams.

The instructions may be further executable by the one or more processors to prioritize the repairs versus other repairs associated with the cloud-computing system.

The instructions may be further executable by the one or more processors to determine that the root-cause records do not contain the root cause of the failure, generate the root cause of the failure based on the events or the health signals, and store the root cause of the failure in the data store.

The instructions may be further executable by the one or more processors to collect tags associated with one or more of the historical tickets. A tag may include information about a root cause of a historical ticket and may have been entered according to a defined schema. Generating the root cause of the failure may be based in part on the tags.

The events emitted by the tasks associated with the capacity provisioning process for the cloud-computing system and the health signals from the one or more external systems may be received according to a data contract.

The instructions may be further executable by the one or more processors to store the events on the data store and store the health signals on the data store.

The instructions may be further executable by the one or more processors to display an execution graph for the capacity provisioning process on a presentation system and display the root cause of the failure on the presentation system.

The instructions may be further executable by the one or more processors to query the external systems for metadata in response to receiving the health signals and store the metadata on the data store.

In accordance with another aspect of the present disclosure, a method is disclosed that is executed by a computing device for automatically determining a root cause of a failure associated with a capacity provisioning process. The capacity provisioning process is for a cloud-computing system. The method includes receiving a ticket. The ticket indicates the failure. The method also includes identifying zero or more potential root causes of the failure. The zero or more potential root causes are described in root-cause records associated with one or more historical tickets. The method also includes assigning scores to the zero or more potential root causes of the failure. The method also includes determining whether the zero or more potential root causes include the root cause based on the scores. The method also includes determining, if the zero or more potential root causes do not include the root cause of the failure, whether the root cause of the failure can be generated without human intervention. The method also includes determining whether repairs for the failure are known based on the root-cause records associated with the one or more historical tickets. The method also includes seeking human intervention if either the root cause or the repairs are unknown. The method also includes attaching, if the root cause is known, the root cause to the ticket. The method also includes identifying, if the repairs are known, one or more repair teams to complete the repairs.

The method may also include generating the root cause of the failure based on events received from tasks associated with the capacity provisioning process, health signals received from external systems that support the cloud-computing system, and tags associated with the historical tickets.

The one or more historical tickets may be included in a set of historical tickets. Identifying the zero or more potential root causes for the failure may include identifying the one or more historical tickets based on comparing the ticket to the set of historical tickets and identifying the root-cause records associated with the one or more historical tickets.

Identifying the one or more historical tickets based on comparing the ticket to the set of historical tickets may include identifying the one or more historical tickets based on performing a similarity analysis between the ticket and the set of historical tickets.

Identifying the one or more historical tickets based on comparing the ticket to the set of historical tickets may include identifying the one or more historical tickets from among the set of historical tickets using a machine-learning engine.

The scores assigned to the zero or more potential root causes for the failure may be based on events received from tasks associated with the capacity provisioning process, health signals received from external systems that support the cloud-computing system, and tags associated with the historical tickets. The scores assigned to the zero or more potential root causes for the failure may be based on metadata received from external systems in response to one or more queries.

In accordance with another aspect of the present disclosure, a computer-readable medium includes instructions. The instructions are executable by one or more processors to cause a computing system to receive events emitted by tasks associated with a capacity provisioning process for a cloud-computing system. The events describe a status of the tasks. The instructions are also executable by one or more processors to cause a computing system to receive health signals from one or more external systems. The health signals may indicate whether the one or more external systems are operational. The instructions are also executable by one or more processors to cause a computing system to receive a ticket. The ticket may identify a failure associated with the capacity provisioning process. The instructions are also executable by one or more processors to cause a computing system to access a data store storing historical tickets of the cloud-computing system. The one or more of the historical tickets have associated root-cause records. The instructions are also executable by one or more processors to cause a computing system to determine a root cause of the failure based on the events, the health signals, the historical tickets, and the associated root-cause records. Determining the root cause of the failure may include pattern-matching the ticket against the historical tickets. Determining the root cause of the failure may include querying external systems (such as through use of metadata collection module 354 in FIG. 3) for metadata related to the health signals. The instructions are also executable by one or more processors to cause a computing system to determine necessary repairs for the failure based on the associated root-cause records and determine an estimated time for the necessary repairs to be complete.

The computer-readable medium may further include instructions that are executable by the one or more processors to cause the computing system to perform the necessary repairs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
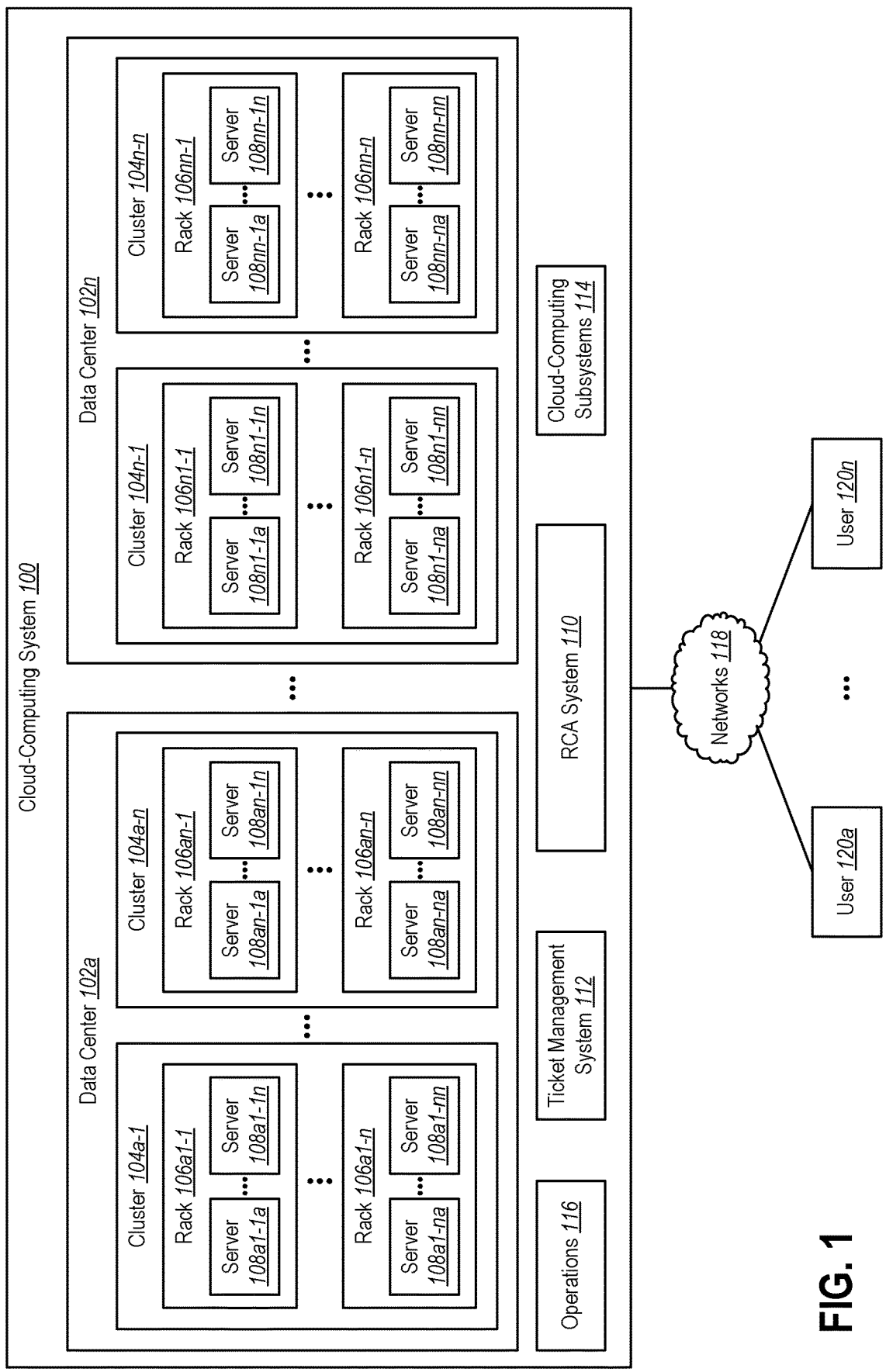
FIG. 1 illustrates an example cloud-computing system that includes a root-cause analysis system.

A cloud-computing platform (which may be referred to as a cloud-computing system) may make compute resources (such as virtual machines) available to customers to host and execute their workloads in a timely manner. Customers may deploy applications by deploying virtual machines on servers of the cloud-computing platform. Customers may scale these virtual machines up or down based on their business needs. As customer needs evolve and grow, the cloud-computing platform may need to construct new data centers or modify existing ones to match capacity demands. Increasing the capacity of a cloud-computing platform may be referred to as capacity provisioning. Replacing capacity (such as upgrading hardware) or reducing capacity may also be capacity provisioning. Capacity provisioning may be accomplished through an automated process, which may be referred to as a capacity provisioning process. A capacity provisioning job may be a process instance. A capacity provisioning process may require executing a set of tasks, some of which have dependencies upon other tasks and other cloud-computing platform sub-systems. In part due to these dependencies, an individual task within the job may fail to complete in a timely manner. When a task is blocked, the cloud-computing platform may create a ticket to alert operations of the blockage. The ticket may not, however, identify a cause of the blockage. Many man hours may be required to investigate and determine the cause and needed repairs. This disclosure presents a comprehensive and automated system for processing these tickets during capacity provisioning, establishing a true cause of failure (which may be referred to as a root cause of failure or RCF), applying remediating actions, and utilizing a feedback loop to learn from such failures. The root cause of the failure may be an initiating cause or a causal chain. Removing the root cause of the failure may prevent the failure from recurring and may allow the process to move forward. The disclosed systems and methods improve overall cloud-computing system operations and capacity provisioning.

The need to have automated root cause prediction/determination may result from various scenarios that arise in capacity provisioning. As a first example, a capacity provisioning job may include manual tasks for installing servers in a datacenter. One task may be data-center operators bolting down and energizing a rack in preparation for server provisioning. The task may be subject to an expected time for completion stated in a service-level agreement. A capacity provisioning job and its associated tasks may be required to be completed within a certain timeframe because any day a rack is sitting in a data center but is not taking traffic results in lost revenue and lost capacity. If the bolting down and energizing a rack does not happen on time, then subsequent tasks may be delayed.

Assume the task is not complete by the deadline. Determining the reason (the root cause for why) the task is not complete may require consulting data from multiple sources. Manually collecting and analyzing the data may be expensive and time consuming. Some potential steps for determining the cause may include determining the datacenter (DC) holiday schedule (is it a holiday or is the datacenter closed?); querying the internal datacenter ticket queue (is there a ticket that impacts this capacity provisioning process instance?); checking the DC spare parts database (is a needed part not available?); querying DC maintenance logs (is there a planned maintenance in the DC?); validating the critical environment (is there a ticket in the colocation DC?); querying metadata from a resourcing system (compare resource availability to active deployments in each location); and checking metadata from vendor system (have contractor schedules changed or have they not checked in). This scenario requires operations to identify the correct root cause from many sub-systems and assign the issue to the right owner for mitigation. This disclosure describes systems and methods for performing this analysis in an automated and repeatable manner.

As a second example, a task may be unable to access certain files it requires because of misconfigured permissions in a region. The permissions required may have been set up incorrectly. As a result, the permissions may need to be compared to permissions from a successful job. Doing so may require multiple steps, such as finding similar jobs, checking their permissions, and comparing them to the permissions of the capacity provisioning job with the issue to identify the correct root cause and owner. The described systems and methods may perform those multiple steps in an automated and repeatable manner.

As a third example, some tasks in a capacity provisioning scenario may depend on other upstream devices to be ready before they can complete. For example, setting up a server may require a network connection provided by a network device. If this dependency is not expressly set up, the task may start early and fail. Finding the problem may involve checking signals from an external system—such as signals indicating the status of network devices and containing historical information—for comparing data from this failed job to a successful job to identify the correct signal as a necessary dependency. The described systems and methods may identify the necessary dependency and notify the appropriate team(s) to resolve the issue in an automated and repeatable manner.

As these example scenarios illustrate, capacity provisioning may be a complex process involving many components and teams that depend on each other temporally and spatially. The goal state, running context, and expertise for tasks needed to complete a particular capacity provisioning job may be stored individually and may be isolated from each other. When a blockage happens in the course of completing a capacity provisioning job, such as in the scenarios above, performing root-cause analysis on the reason(s) for the blockage and unblocking the issue so that the job can proceed may require a significant amount of manual intervention and forensics across many systems and teams.

An automated root-cause analysis (RCA) system that streamlines the process of automatically determining the root cause of a blockage, who should own the blockage, and how to resolve and mitigate the blockage may improve the capacity provisioning process and ultimately the cloud-computing system.

The automated RCA system is a fully automated platform that may provide dependency and execution order modeling for tasks included in a capacity provisioning job, anomaly detection, ticket correlation, root cause analysis, monitoring and feedback, and data visualization. The automated RCA system may facilitate efficient completion of cloud capacity provisioning jobs. The automated RCA system may use data collected under schema defined in data contracts to perform automated root cause analysis, determine owners for repairs, and resolve blockers encountered in a job. The automated RCA system may include multiple layers, such as a foundational layer, a decision engine layer, and a monitoring and action layer.

The foundational layer may collect and store data for use in determining a root cause of a blockage on a capacity provisioning job. The blockage may be identified in a ticket generated by a cloud-computing system. The foundational layer may continuously receive and pull data from a variety of sources and services under one or more data contracts. The foundational layer may process tasks that emit events to the foundational layer and each other. The foundational layer may cache and aggregate the collected data at speed for downstream and later use by the decision engine layer. The foundational layer may receive or generate an execution graph for the capacity provisioning job that indicates an execution order for tasks included in the capacity provisioning job, dependencies among the tasks, and dependencies of the tasks on cloud-computing sub-systems. The foundational layer may store information sufficient to generate execution graphs for previous capacity provisioning jobs.

The foundational layer may include a data collection/aggregation system. The data collection/aggregation system may use a common contract for signal collection. The data collection/aggregation system may collect multiple types of data through a well-defined standardized schema that allows the automated RCA system to enrich the data through an extensible and automated process. The data collection/aggregation system may store collected data in a data store. The data collection/aggregation system may receive registered events from tasks. The registered events may detail task progress, such as reaching an intermediate state or completing certain actions. External systems may send health signals defined in a common schema to the data collection/aggregation system. The data collection/aggregation system may use a metadata query to pull in-depth information on the external system's state. The data collection/aggregation system may pull root-cause records generated by the system and structured tags (annotations) manually entered by users. The root-cause records may identify an RCF for an incident and necessary repairs for the incident.

The decision engine layer may receive the ticket and attempt to determine the root cause of the blockage based on root causes associated with previous tickets generated by the cloud-computing system and, potentially, based on data collected and stored by the foundational layer. The decision engine layer may use anomaly detection and similarity-based correlation to create a high-level root cause list from the root causes stored in the cloud-computing system. The decision engine may evaluate the root cause list to identify a true root cause, recommend repair items based on the true root cause, identify one or more responsible teams to drive a fix, and provide an estimated time for completion. The accuracy of this root cause analysis (RCA) methodology may be evaluated through corroboration with metadata and associated dependencies pulled from external systems and saved in the data store. These inputs may allow the decision engine layer to determine if the decision engine layer has enough information to automatically assign repair items and apply mitigation steps to allow the job to progress in execution. The decision engine layer may generate a root cause if the repair items are known. Alternatively, if the decision engine layer is unable to automatically identify a root cause of the issue, the decision engine layer may declare the root cause to be "unknown" and request user intervention to investigate and resolve the problem manually. The decision engine layer may be a hybrid push-pull system because it can pull data and generate new data when and where needed.

The monitoring and action layer may enrich blockage context and reprioritize and recover from tickets. The monitoring and action layer may identify how data was used in order to learn how to shorten root cause evaluation time in the future. The monitoring and action layer may also include a data visualization component through which users may review and interact with information generated by the automated RCA system.

The monitoring and action layer may make information generated from the decision engine layer accessible via a user interface. The monitoring and action layer may be included in a monitoring and action layer, such as monitoring and action layer 226. The monitoring and action layer may show that a ticket was resolved and what was done to resolve the ticket. For example, the monitoring and action layer may show in the user interface that a setting was added to resolve a failure in a capacity provisioning job and show a current status of the capacity provisioning job, such as progress along an execution graph.

The monitoring and action layer may also record the information into the ticket management system. Various ticket attributes within the ticket management system may be added (such as root cause tags) or updated (such as ticket priority). For instance, if another subsystem is unhealthy, the monitoring and action layer may append a chart showing the health signal to the ticket. Tickets that are considered serious for tasks blocking critical path execution of a given job are set to a higher severity for users to prioritize resolution. In addition, with knowledge of a given job's current state and how prior jobs of similar type execution progressed, the automated RCA system may produce ETA predictions for tasks and tickets. Users may view these estimates and identify areas for further improvement to shorten the root cause evaluation time. For issues where the system automatically applies a recovery action, the user interface may show the actions taken and the rationale for those actions.

For example, consider an example where a job blocks on validating that wiring for servers is correct and a wire needs to be replaced. Assume that a service level agreement requires that the wire be replaced within eight hours. Assume no action occurs within eight hours. The automated RCA system may query the data store to determine whether there are blockers on a technician completing the repair. The automated RCA system may store signals from a data center critical environments system. If there is any failure on the data center floor, the technician may not be able to complete the repair. The RCA system may query a database that describes employee availability. If it is a holiday, the technician may not make the repair right away. The automated RCA system may query an inventory system to see if any needed parts are unavailable. The automated RCA system may quickly determine what the root cause of the failure is and a likelihood for it to be resolved quickly as well. The automated RCA system may avoid a need to call the data center about the blockage. The automated RCA system may infer what the status of the repair is when it fails or is delayed.

The monitoring and action layer may include a closed loop feedback layer. The closed loop feedback layer may receive output from the decision engine layer. The results of the decision engine may guide recovery from faults. In some cases, the closed loop feedback layer may take automatic actions, such as changing configurations and assigning tickets to other responsible teams. For example, if the closed loop feedback layer detects new changes in a job configuration that are resulting in failures, the closed loop feedback layer may roll back to an earlier known good configuration. When users are required to manually intervene to resolve an issue, the users may add the RCF to the data store for future use. Also, users may introduce structured tags into the ticket to describe the issue and improve the automated RCA system's ability to auto root cause future regressions. The closed loop feedback layer may add the structured tags to the ticket in the ticket management system or the root cause record in the RCA store. If the same issue occurs on a different job, the decision engine layer may have a better chance to identify the root cause and match to an existing RCF. The closed loop feedback layer may be included in the monitoring and action layer, such as the monitoring and action layer 226.

FIG. 1 illustrates an example cloud-computing system 100. The cloud-computing system 100 may make compute resources and applications available to users, such as users 120*a*—n, through networks 118. The users 120*a*—n may include clients of the cloud-computing system 100 that upload applications onto servers of the cloud-computing system 100. The users 120*a*—n may include individuals who access the applications hosted on the servers of the cloud-computing system 100.

The cloud-computing system 100 may include a large amount of physical computing resources, including processing cores, storage space, and memory. These physical computing resources may be used to host virtual machines. The virtual machines may host applications. The users 120*a*—n may access those applications remotely. The physical computing resources may be organized according to a particular structure. For example, physical computing resources may be organized into nodes (also referred to as servers or blades). A group of nodes may form a rack. A group of racks may form a cluster. A data center may house multiple clusters. A cluster may span multiple data centers. And the cloud-computing system 100 may include multiple data centers located in different regions of the world.

FIG. 1 illustrates one way that computing resources may be organized in a cloud-computing system. The cloud-computing system 100 may include data center 102*a* and data center 102*n*. The data centers 102*a*, 102*n* may be physical structures that house physical computing resources. Each data center may have a particular location. The data centers may be organized into zones and/or regions. The data centers 102*a*, 102*n* may include multiple clusters. For example, the data center 102*a* may include cluster 104*a*-1 and cluster 104*a*-*n*. The data center 102*n* may include cluster 104*n*-1 and 104*n*-*n*. The clusters 104*a*-1, 104*a*-*n*, 104*n*-1, 104*n*-*n* may include multiple racks. For example, the cluster 104*a*-1 may include rack 106*a*1-1 and 106*a*1-*n*. The cluster 104*a*-*n* may include rack 106*an*-1 and rack 106*an*-*n*. The cluster 104*n*-1 may include rack 106*n*1-1 and rack 106*n*1-*n*. The cluster 104*n*-*n* may include rack 106*nn*-1 and rack 106*nn*-*n*. Each rack may include multiple servers. For example, the rack 106*a*1-1 may include server 108*a*1-1*a* and server 108*a*1-1*n*. The rack 106*a*1-*n* may include server 108*a*1-*na* and server 108*a*1-*nn*. The rack 106*an*-1 may include server 108*an*-1*a* and server 108*an*-1*n*. The rack 106*an*-*n* may include server 108*an*-*na* and server 108*an*-*nn*. The rack 106*n*1-1 may include server 108*n*1-*la* and server 108*n*1-1*n*. The rack 106*n*1-*n* may include server 108*n*1-1*a* and server 108*n*1-1*n*. The rack 106*nn*-1 may include server 108*nn*-1*a* and server 108*nn*-1*n*. The rack 106*nn*-*n* may include server 108*nn*-*na* and server 108*nn*-*nn*.

The cloud-computing system 100 may include cloud-computing subsystems 114. The cloud-computing subsystems 114 may include systems that support the cloud-computing system 100. Examples of the cloud-computing subsystems 114 may be a power supply system, an air-conditioning system, and network systems. Other cloud-computing subsystems 114 may be databases that store information about a maintenance schedule of a data center, a working schedule for employees of the data center, and spare parts available at the data center. The cloud-computing subsystems 114 may include systems of the cloud-computing system 100, including systems that manage server/node health and monitor network connection status.

Over time the cloud-computing system 100 may need additional computing resources to meet demands of clients and customers. Capacity provisioning may be any process that increases an amount of physical computing resources available to the cloud-computing system 100. For example, capacity provisioning may include adding additional racks to cluster 104*a*-1. Constructing a new data center may also be an example of capacity provisioning. Capacity provisioning may also be a process that reduces an amount of physical computing resources available to the cloud-computing system 100, such as in the case of decommissioning. Capacity provisioning may also be a process that modifies physical computing resources available to the cloud-computing system 100, such as in the case of upgrading hardware. A job may be a workflow for accomplishing capacity provisioning. The job may include one or more tasks (such as software and hardware tasks) that must be completed to accomplish capacity provisioning. Hardware tasks may include human-driven tasks such as cabling and bolting. For example, a job of adding racks to cluster 104*a*-1 may involve tasks such as climatization, moving racks to tiles on the DC floor, bolting and energizing, wiring racks, connecting the racks to the network, adding security software to nodes included in the racks, and deploying a host operating system to those nodes.

Operations 116 may include individuals tasked with executing jobs to accomplish capacity provisioning. The operations 116 may include technicians and engineers who perform hardware and software tasks included in the jobs. The operations 116 may include software development and IT operations teams. The cloud-computing system 100 may complete or attempt to complete some tasks included in a job without assistance from the operations 116.

In the course of completing a job, one or more tasks included in the job may fail to complete or fail. The cloud-computing system 100 may include a ticket management system 112. The ticket management system 112 may provide a service for other systems to create a ticket whenever a job or task fails to complete. The other systems may create a ticket when a job or task fails to complete by a specified deadline. The other systems may create a ticket in response to the operations 116 indicating that the operations 116 cannot complete a specific job or task. The other systems may create a ticket automatically using the ticket management system 112 when the cloud-computing system 100 determines that a task or job has failed, has failed to complete by a specified deadline, or has not been marked as complete by the operations 116 by a specified deadline. A ticket may identify a problem and contain additional information regarding a job or task at issue. The ticket may not identify a root cause of the problem. The ticket management system 112 may manage escalations of the ticket based on severity. The ticket management system 112 may route the ticket to owning teams.

A service-level agreement may define the specified deadline or the expected time for completion for a capacity provisioning job and all its underlying tasks. For example, a job may include tasks such as wiring up racks, checking network connections, updating software, and performing checks. Each of those tasks may have a defined timeline for completion stated in a service-level agreement such that the job can be completed within a time period defined in the service-level agreement. Therefore, every task in a critical path of a job (such as building out a cluster) may be tracked. And any task that fails to complete may result in the ticket management system 112 issuing a ticket for the failure.

One way to respond to a ticket is for the operations 116 to manually investigate the root cause of the problem identified in the ticket. Doing so may require the operations 116 to check multiple different systems and consult with multiple different teams. Manually investigating the root cause of the problem identified in the ticket may be a time-consuming and expensive process.

To more efficiently determine the root cause of the problem identified in a ticket and expedite a repair and mitigation process the cloud-computing system 100 may include a root-cause analysis (RCA) system 110. The RCA system 110 may provide a fully automated platform for monitoring job execution and assigning root causes and necessary repairs to job blockages, including blockages identified in tickets issued by the ticket management system 112. The RCA system 110 may model jobs, execution order of tasks that are part of the jobs, and dependencies between the tasks. The RCA system 110 may include anomaly detection, monitoring and feedback, and data visualization.

The RCA system 110 may include a foundational layer. The foundational layer may include an event-driven orchestration system and a data collection/aggregation system.

Capacity provisioning jobs and their tasks may issue events. The events may provide information about the jobs and the tasks. For example, the events may indicate how far along the task is, a status of the task, and whether the task is completed. The events may indicate any dependencies the task has. The event-driven orchestration system may receive events from tasks. Events may facilitate generation of an execution graph to track progress of the capacity provisioning job. The execution graph may represent an actual path of execution of a capacity provisioning job. Dependencies among tasks may be defined in a separate dependency graph. In the alternative, the execution graph may define a planned execution of the job and describe dependencies of tasks contained within the job.

Tasks may also receive events from other tasks. Capacity provisioning tasks may use events for orchestration and coordination. For example, a second task may not begin until all its dependencies are satisfied. The second task may depend on a first task. When the first task reaches a goal state, the first task may emit a corresponding event registered for the goal state. A goal state may be a state in which a task or a job passes necessary validation checks. The second task may receive the corresponding event from the first task. If the second task has no other dependencies, the second task may execute upon receiving the corresponding event from the first task.

Tasks may have two types of dependencies. Dependencies may be expressly described in an execution graph, a dependency graph, events, or a task. Dependencies may also be implicit but not expressly recorded. If a dependency exists but has not been expressly declared in a task, an execution graph, or a dependency graph, the RCA system 110 may have to infer the dependency based on events and potentially events and execution graphs from other similar jobs.

The data collection/aggregation system may continuously collect and record data from multiple sources for use by the RCA system 110 in performing root-cause analysis. The data collection/aggregation system may record data in a data store. The data collection/aggregation system may record events emitted by capacity provisioning tasks and corresponding execution graphs generated based on the events. The data collection/aggregation system may receive and store health signals from external systems, such as the cloud-computing subsystems 114. Health signals may indicate whether an external system is functioning properly. When receiving a health signal that indicates an external system is unhealthy, the data collection/aggregation system may issue a predefined metadata query to pull additional context from the external system. The data collection/aggregation system may save the additional context in the data store. The data collection/aggregation system may collect root-cause records from an RCA data store and structured tags entered by users in the ticket management system 112. The root-cause records in the RCA data store may describe root causes and repairs for one or more failures identified in tickets issued by the ticket management system 112. The structured tags may be metadata (and may indicate root cause) that users have entered associated with tickets issued by the ticket management system 112.

The RCA system 110 may include a decision engine layer. The decision engine layer may be characterized as a brain of the RCA system 110. The decision engine layer may use data collected and stored by the data collection/aggregation system to determine an RCF for a ticket. The decision engine layer may scan tickets and root-cause records stored in the data store to generate a candidate RCF list. The decision engine layer may assign a score to RCFs included in the candidate RCF list. The score may be based on data stored in the data store by the foundational layer. The score may be based on whether the RCF has associated known repairs.

The decision engine layer may identify an RCF from the candidate RCF list as the root cause of the ticket. The decision engine layer may identify the RCF as the root cause of the ticket if the RCF is assigned a score above a threshold. The decision engine layer may determine that the candidate RCF list does not include the root cause of the ticket if the candidate RCF list does not include an RCF with a score above the threshold. If the decision engine layer does not identify the root cause of the ticket within the candidate RCF list (which may occur if the issue identified in the ticket is new), the decision engine layer may analyze information in the data store and attempt to identify a root cause. The decision engine layer may generate a new RCF. The decision engine layer may generate the new RCF after checking relevant health signals and events, pulling additional data from systems that may influence or impact the area reporting the issue, or scanning tags associated with relevant tickets. The decision engine layer may add the new RCF to the data store. The decision engine layer may determine that it cannot generate a new RCF without human intervention. In that case, the decision engine layer may seek the help of a human to provide metadata to identify an RCF. A root-cause record created by a human may be added to the data store.

The output of the decision engine layer may be the root cause of the issue. If an RCF already exists, the decision engine may attach the RCF to the ticket. If an RCF is unavailable but the decision engine layer can derive the RCF using information on the data store and information pulled from other systems, the decision engine layer may generate an RCF, assign the RCF to the ticket, and add the RCF to the RCA data store for future cases. Based on the RCF, the decision engine layer may assign repairs to one or more owning teams in the operations 116. When the decision engine layer runs an analysis and does not determine a root cause, the decision engine layer may generate a report of the analysis for the operations 116. The report may identify what was checked so the operations 116 can perform further investigation in an expedited manner. The operations 116 may create a tag for the ticket. The tag may describe a root cause of the incident identified in the ticket.

The RCA system 110 may include a monitoring and action layer. The monitoring and action layer may add more information to the ticket by aggregating data from all related systems. The monitoring and action layer may reprioritize the ticket and may route the ticket to the right responsible team(s). If the ticket requires a software rollback or a configuration change, the RCA system 110 may modify the job to perform this change without need for human intervention.

The monitoring and action layer may include a dashboard. Outliers, critical paths, and RCA actions may be passed to the dashboard to present the cloud-computing system 100 status along with ongoing tickets. The dashboard may include the configuration state of active jobs, summarize metrics and trends related to the cloud-computing system 100. The dashboard may also include priority job runs and display the operational cost of blocked jobs.

Figure 2:
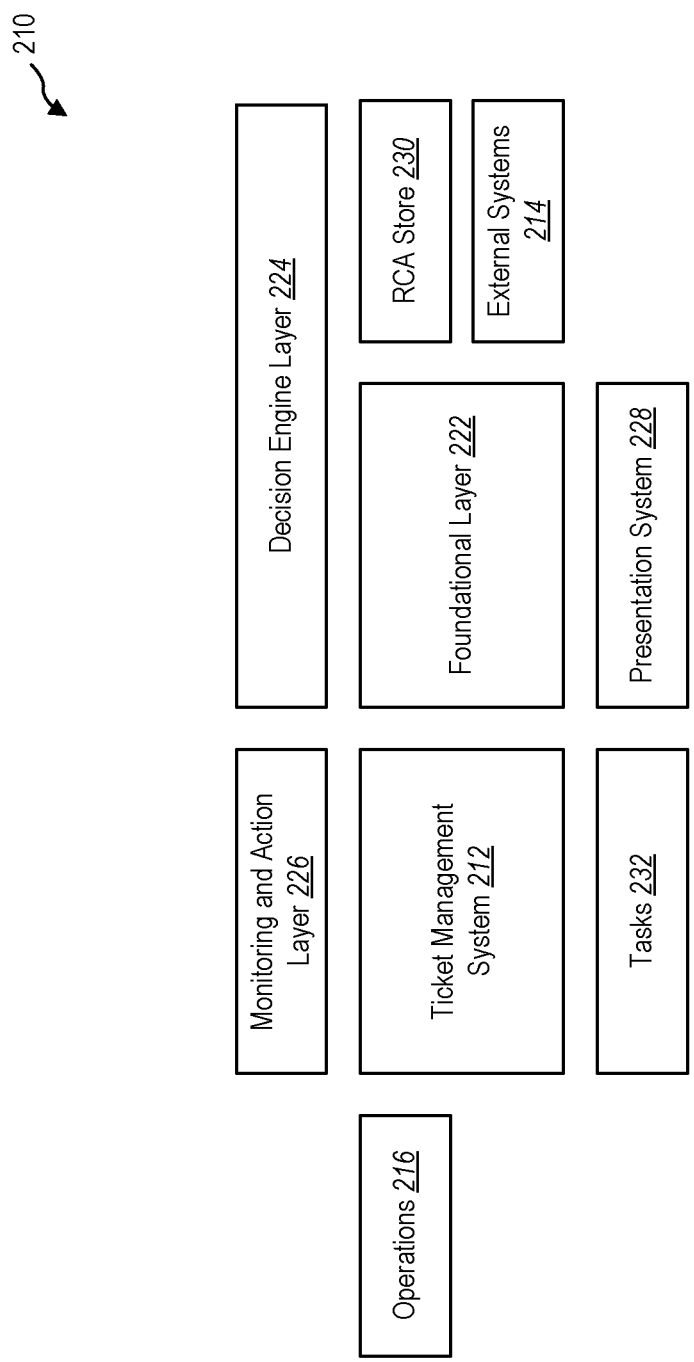
FIG. 2 illustrates an example root-cause analysis system.

FIG. 2 illustrates an example RCA system 210.

The RCA system 210 may include a foundational layer 222. The foundational layer 222 may receive and request data from a number of different sources and store collected data in a data store. The foundational layer 222 may format the collected data before storing it on the data store.

The foundational layer 222 may include an event driven orchestration system and a data collection/aggregation system.

A capacity provisioning job may consist of a series of tasks 232 with predefined goal state events to emit. The tasks 232 may listen for events emitted by each other. There may be a many-to-many mapping of dependencies between tasks. When a job starts, the event driven orchestration system may create an execution graph. The execution graph may define a list of tasks and associated goal states. The execution graph may describe an order of task execution and dependencies. In the alternative, the dependencies may be described in an associated dependency graph. As tasks within the job execute, the tasks may emit and listen for events and send execution context information via a well-defined data contract. The event driven orchestration system may also receive events from the tasks 232. When all tasks are in their goal state, the job may be deemed complete.

A data contract may be an understanding between two entities (or subsystems) in a system or one entity in the system and an entity outside the system. The data contract may govern an exchange of data between the entities. The data contract may ensure that the entities know when to expect data and the format of the data. In other words, the data contract may contain terms under which a first entity provides data to or requests data from a second entity. The data contract may define a particular format in which the first entity will provide the data to or request the data from the second entity. The data contract may define a frequency with which data will be provided or requested. The data contract may be a form of a service level agreement. The data contract may define when the first entity expects data from the second entity, a desired format, and a desired latency. For example, a health signal data contract may require a periodic signal from a node indicating whether the node is currently taking traffic or not. The health signal could be a binary "0" or "1" signal. Or the health signal may contain a list of data sets along with a ping conveying node state, node health, how many virtual machines the node is housing, what type of workloads the node is supporting, and the node's uptime.

The data contract may define a schema for the tasks 232 to use for pushing events to each other and to the event driven orchestration system. An example schema may be as follows:

```
{
    "TaskId": "F84CE76A-BE07-442F-808E-F1913DB8A074",
    "EventName": "ConfigurationComplete",
    "Scope": "Cluster",
    "Timestamp": "04-23-2020 13:19",
    "Region": "uswest",
    "Cluster": "Cluster1",
}
```

The data collection/aggregation system may collect and receive multiple types of data. The data collection/aggregation system may receive events from the event driven orchestration system or the tasks 232. These events may detail progress, such as reaching an intermediate state or completing certain actions, of associated tasks.

The data collection/aggregation system may receive health signals from external systems 214. The external systems 214 may include any system not included in the RCA system 210, including the cloud-computing subsystems 114 and other systems of the cloud-computing system 200. For example, the external systems 214 may include nodes of a data center or a parts inventory system. The external systems 214 may push the health signals to the data collection/aggregation system using a common schema defined in a data contract. The health signals may update the RCA system 210 on a status of the external systems 214. The health signals may indicate whether the external systems 214 are functioning. The health signals may include additional information. For example, for a node, a health signal may include a node state, node health, a number of virtual machines the node is hosting, types of workloads it is supporting, and an uptime.

When the data collection/aggregation system receives an unhealthy signal, the data collection/aggregation system may send a pre-defined metadata query to pull additional context from the external systems 214. A schema for the pre-defined metadata query may be defined in a data contract. The external systems 214 may store metadata in data stores or SQL databases. The external systems 214 may store the metadata as structured or unstructured data. The metadata may be metrics of the external systems 214.

The data collection/aggregation system may pull information from the external systems 214 separate from responding to an unhealthy signal. For example, the data collection/aggregation system may pull a holiday schedule from a personnel management system included in the external systems 214.

The data collection/aggregation system may pull root-cause records generated by the RCA system 210. A root-cause record may be associated with one or more tickets that a ticket management system 212 may have issued. The tickets may identify an incident, issue, or job blockage experienced by a cloud-computing system. The root-cause record may describe a root cause of the incident identified in the ticket. The root-cause record may include details about mitigation efforts associated with the root cause of the incident. The root-cause record may include repairs for resolving the issue or the job blockage. The data collection/aggregation system may store tickets associated with the root-cause records.

The data collection/aggregation system may pull structured tags manually entered by users. A tag (which may also be referred to as an annotation) may be a record manually created by a user. If the RCA system 210 encounters an issue, incident, or job blockage for which the RCA system 210 fails to identify a root cause, a user may create a tag describing characteristics of the issue, incident, job blockage, or problem. The tag may describe how to classify this type of problem in the future. The tags may be linked or associated with one or more tickets identifying the issue, incident, job blockage, or problem.

The RCA system 210 may include a decision engine layer 224. The decision engine layer 224 may attempt to determine a root cause of a ticket and necessary repairs for the ticket. The decision engine layer 224 may be a hybrid push-pull system. The decision engine layer 224 may ingest as well as generate data based on a given scenario. The decision engine layer 224 may include the data store. The data store may include the distributed event driven signals persisted from the external systems 214. The data store may be developed using a common schema into which the external systems 214 publish events and data as per defined data contracts. These signals may be cached and made available for the decision engine layer 224 to increase speed of the RCA system 210.

The decision engine layer 224 may receive a ticket. The ticket management system 212 may issue the ticket. The ticket may identify a problem (such as an incident, an issue, or a job or task blockage). The ticket may include information that comes from a job. The ticket may identify an owning component team and one or more impacted component teams. The ticket may identify an environment in which the problem arose, such as a region, a zone, or a control plane. The decision engine layer 224 may scan historical tickets (which may be referred to as archived tickets) stored in the data store to try and identify matching tickets that are similar to the ticket received from the ticket management system 212. The historical tickets may be tickets that the ticket management system 212 previously issued. Each of the historical tickets may have zero or more root-cause records associated with it. A root-cause record may identify a root cause of a historical ticket. A root-cause record may identify necessary repairs for the root cause of the historical ticket. The decision engine layer 224 may compare the ticket to one or more of the historical tickets to identify the matching tickets. The decision engine layer 224 may use similarity analysis to identify matching tickets. A matching ticket may be a historical ticket that has one or more pre-defined similarities with the ticket. The matching ticket may be a historical ticket that has a similarity to the ticket above a threshold based on a pre-defined algorithm.

If the decision engine layer 224 identifies a matching ticket and the matching ticket has an associated RCF (which may be identified in a root-cause record associated with the matching ticket), the decision engine layer 224 may attach the associated RCF to the ticket, attached needed repairs (which may be identified in the root-cause record containing the RCF) to the ticket, identify one or more responsible teams to resolve the ticket, send the RCF to the one or more responsible teams, and close the ticket. The decision engine layer 224 may use information contained in the data store to verify that the associated RCF is the root cause of the ticket.

If the decision engine layer 224 identifies multiple matching tickets and the multiple matching tickets have more than one associated RCF, the decision engine layer 224 may identify a valid RCF from among the more than one associated RCF, attach the valid RCF and needed repairs to the ticket, identify one or more responsible teams to resolve the ticket, send the RCF to the one or more responsible teams, and close the ticket. The decision engine layer 224 may use information contained in the data store to identify the valid RCF.

If the decision engine layer 224 does not identify a matching ticket (which may occur if the ticket presents a new issue), the decision engine layer 224 may use information contained in the data store and pull additional information from the external systems 214 to generate a root cause of the ticket. To identify the root cause the decision engine layer 224 may check relevant health signals and events, pull additional data from systems (such as the external systems 214) that may influence or impact an area reporting an issue described in the ticket, analyze an execution graph and dependency graph associated with a job associated with the ticket, and scan any tags provided by humans. The decision engine layer 224 may also compare an execution graph of a current capacity provisioning job to execution graphs for previous capacity provisioning jobs to determine whether the issue results from any changes between the execution graphs. The decision engine layer 224 may generate a new root-cause record with a new RCF based on this evaluation.

For example, a job may include executing a piece of software. The piece of software may depend on deployment infrastructure such as a DNS service that has not been set up yet. The decision engine layer 224 may determine that the job is blocked because the job has reached a task that has a dependency that has not yet been met. The decision engine layer 224 may determine that the dependency has not yet been met because the data store does not include an event indicating that the dependency is complete. The decision engine layer 224 may generate a new RCF based on this determination. As another example, dependencies may have been met before a task began executing but a dependency may fail while the task is executing. The decision engine layer 224 may determine based on events in the data store that the dependency is no longer satisfied and generate a new RCF based on this determination.

In some situations in which the decision engine layer 224 generates a new root-cause record, the decision engine layer 224 may require human intervention to determine necessary repairs. A human may add the repairs to the new root-cause record and the new root-cause record may be added to the RCA store 230.

If the decision engine layer 224 determines that the decision engine layer 224 cannot identify an existing RCF for the ticket or generate a new RCF, the decision engine layer 224 may request human intervention to supply needed metadata to determine an RCF. The decision engine layer 224 may also request human intervention to supply needed repairs for the ticket. The decision engine layer 224 may assign the ticket to an owning team of a component that emitted the failure to determine a root cause.

To improve speed and accuracy the decision engine layer 224 may include a machine-learning engine for use in creating a list of RCFs that potentially describe a root cause of the ticket. The machine-learning engine may use a similarity-based analysis for identifying previous tickets that match the ticket. The machine-learning engine may also include custom heuristics, be regex based, be rule based, include text analytics, or include natural language processing. The decision engine layer 224 may create the list of RCFs that potentially describe the root cause of the ticket using RCFs associated with matching tickets. The decision engine layer 224 may use the list of RCFs to determine an actual RCF and repair items for sending to one or more teams responsible for necessary fixes.

The decision engine layer 224 may further include a pruning module to refine the list of RCFs that potentially match the ticket. The pruning module may prune the list of RCFs by pruning the matching tickets based on impact analysis. Pruning may be based on time and spatial correlation. If a set of incidents are localized to a particular region, the pruning module may conclude that the set of incidents is not relevant to an incident in another location. As a result, the pruning module may prune RCFs associated with the set of incidents. As another example, the pruning module may analyze whether the issue is localized to just one DC or is a global issue. The pruning module may also analyze whether there is a temporal event that has caused the issue. For example, the pruning module may analyze whether a particular incident occurred only because a certain software configuration change happened.

The machine-learning engine and pruning module are non-essential to the decision engine layer 224 but may improve accuracy and speed of information retrieval.

As part of determining an RCF for a ticket, the decision engine layer 224 may assign a score to RCFs that the decision engine layer 224 identifies as possible root causes for a ticket (such as root causes associated with tickets similar to the ticket). If an RCF exists for the ticket and repair items are known for the ticket, the score may be available and high. In that case, the decision engine layer 224 may assign an RCF to the ticket, identify the repair items and one or more responsible teams, and close the ticket. The outcome of the repair items may be used by other systems to apply/mitigate and take actions.

If the score is low, the decision engine layer 224 may be able to determine repair items needed to close the ticket but the precise RCF may be unavailable. In this case, the decision engine layer 224 may generate a new RCF and enrich the RCA store 230 for future cases. In the alternative, the decision engine layer 224 may be unable to generate a new RCF and may seek human assistance.

If the score is low, the decision engine layer 224 may be able to determine an RCF but unable to determine repair items needed to close the ticket. In this case, the decision engine layer 224 may seek human assistance to determine needed repairs.

If a score is unavailable, the decision engine layer 224 may determine that an RCF is unavailable and the repair items and responsible team(s) to fix the issue are unknown. In this case, the decision engine layer 224 may determine that the data store does not have the information required to determine the RCF and that human intervention is needed to determine a root cause and identify the repair items. The decision engine layer 224 may assign the ticket to an owning team of a component that emitted the failure to determine a root cause. The feedback from the human intervention may flow into the data store to allow the RCA system 210 to learn and improve for future cases. This feedback may be created using structured tags for reuse and classification purposes. The structured tags may be linked to the ticket. A structure tag may contain indicators (such as the specific hardware class causing the issue) that the RCA system 210 may use in identifying future tickets matching an RCF to which the tag is linked.

For designs in which the decision engine layer 224 uses a scoring system, potential outputs from the decision engine layer 224 may include the following.

First, an RCF and repair are known (Scenario: Score is available). For example, a task may be unable to access certain files the task requires in a region. The error message that is returned is known. The cloud-computing system may have experienced this error message before and have a patch to fix it. As a result, the RCA store 230 may include an RCF associated with this error message. The decision engine layer 224 may find prior tickets with this fault code and the associated RCF. A mitigation layer (such as a monitoring and action layer 226) may apply the patch and associate the ticket with the RCF.

Second, a repair is known but an RCF is not available (Scenario: Score is poor). For example, there may be cases where a failure manifests itself because of the same issue in a different way. A bug related to formatting a hard drive may show up as a different exception on Seagate drive versus a Samsung drive. A repair may have been created for Samsung. But if an incident is for a Seagate drive, there may not be an associated RCF. As another example, a task for setting up a server fails because the task has a dependency on an upstream network device, but the dependency was not set up in the job scenario. The decision engine layer 224 may look at prior runs of this job scenario. The decision engine layer 224 may find differences in the execution graph. The upstream network device may have run before the task in previous job scenarios but is set to run after the task in the current job scenario. The decision engine layer 224 may use metadata from the external systems 214 about the status of network devices to identify the upstream network device as the issue. The RCA system 210 may add a correct dependency for this task. Because the RCF has not been seen before, the RCA system 210 (such as through the monitoring and action layer 226) may create and save a new RCF in the RCA store 230.

Third, RCF exists but repairs are unknown (Scenario: Score is poor). The RCA system 210 (such as through the monitoring and action layer 226) may seek human intervention to determine the repairs for the RCF. The RCA system 210 may associate the repairs with the RCF and store the repairs and the RCF in the RCA store 230 for future use.

Fourth, repair and RCF are unknown (Scenario: Score is unavailable). For example, on a given hardware class, hard drives may fail due to an invalid configuration. This failure may cause a ticket when the job scenario includes a check for hard drive health or when it attempts to format the disk. The RCA system 210 may be unable to determine what caused the issue because no reliable indicators may exist. As a result, the RCA system 210 may assign the ticket to the owning team of the component that emitted the failure for human intervention to determine a root cause. Operations 216 may review the ticket and create a manual annotation (tag) describing the issue, including what hardware class causes this issue. For future tickets, this identification may now be automatic. If the RCA system 210 sees an issue on a job scenario matching this hardware class, the RCA system 210 may mark this ticket as belonging to this RCF. When this hard drive issue has been resolved and will no longer occur, the annotation may be manually removed from the data store. The annotation/tag may be automatically removed when repair items being tracked are resolved.

The RCA system 210 may include the monitoring and action layer 226 and a presentation system 228. The monitoring and action layer 226 may add additional information to tickets issued by the ticket management system 212. The monitoring and action layer 226 may get additional information through a health signal or a metadata query and add it in to the ticket so the ticket is more useful for someone who has to manually fix the problem. For example, there may be a checkpoint in a job where blades start booting up. Due to errors, the blades may not start up. A ticket may say that an insufficient number of blades have started up. The monitoring and action layer 226 may do a metadata query against a system included in the external systems 214 that is monitoring the health of all the blades. The monitoring and action layer 226 may put received metadata into the ticket so that the ticket is more useful. The metadata may allow the operations 216 to see that some of the blades are not starting up because of a first error and another set of blades are not starting up because of a second error.

The monitoring and action layer 226 may allow the RCA system 210 to show results of what has happened. The monitoring and action layer 226 may add information to the ticket showing that the ticket was resolved and describing what was done to resolve the ticket.

The monitoring and action layer 226 may add the RCF to the ticket. That way if the RCF is incorrect, the operations 216 may be able to fix the information.

The presentation system 228 may display information about tickets and failures or blockages identified in the tickets for viewing by users. The presentation system 228 may also allow the users to interact with the displayed information and input information. The presentation system 228 may indicate whether the tickets have an associated root cause. The presentation system 228 may indicate whether multiple tickets have been linked to the same root cause. The presentation system 228 may indicate that the tickets do not have a root cause or do not have repairs. The presentation system 228 may allow the users to assign root causes or repairs to tickets. The presentation system 228 may allow the users to link tickets to other tickets. The presentation system 228 may be included in the monitoring and action layer 226.

Figure 3:
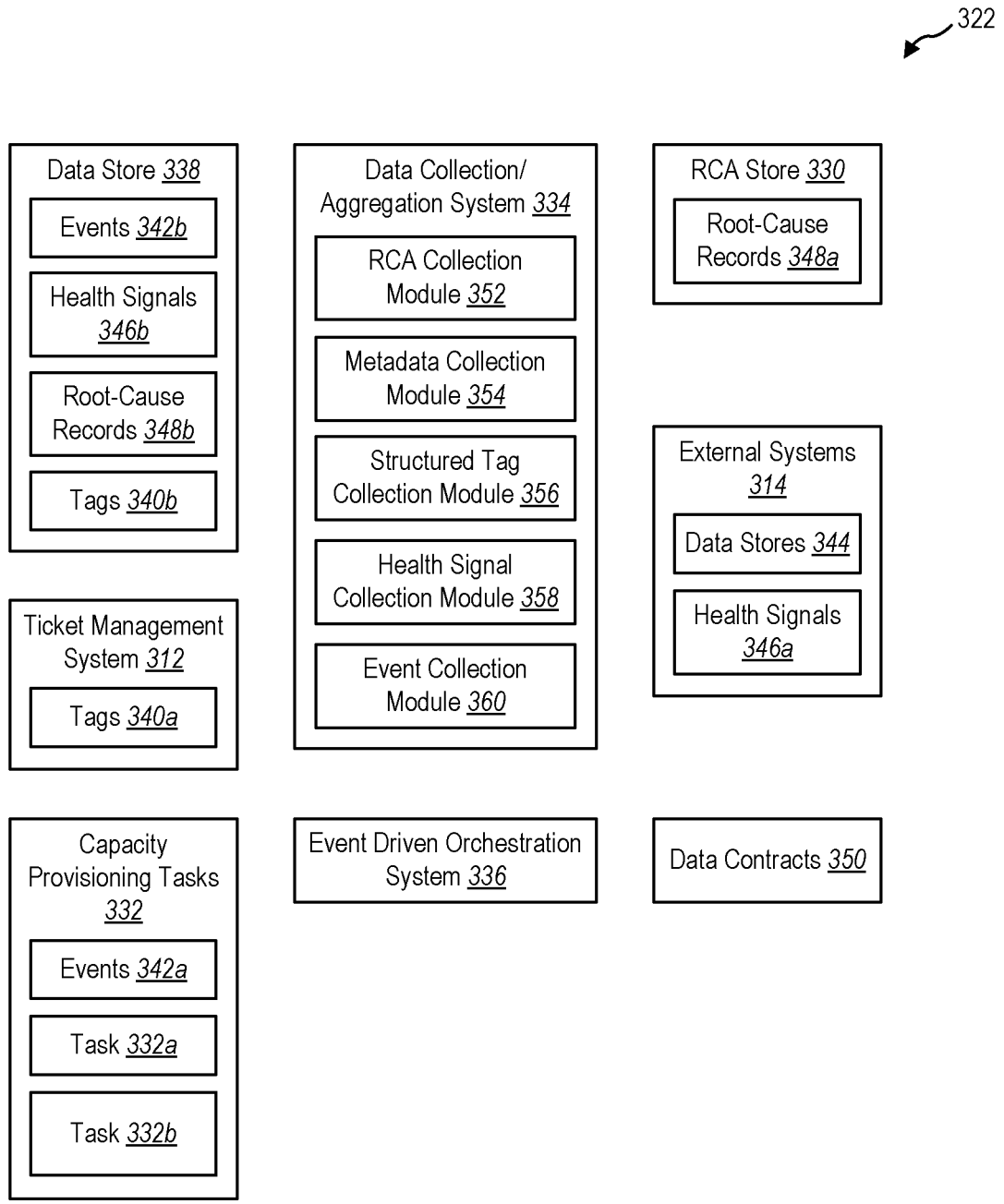
FIG. 3 illustrates an example foundational layer of a root-cause analysis system.

FIG. 3 illustrates an example foundational layer 322. The foundational layer 322 may include an event driven orchestration system 336 and a data collection/aggregation system 334.

The event driven orchestration system 336 may receive information from capacity provisioning tasks 332. The capacity provisioning tasks 332 may include active tasks that are part of capacity provisioning jobs. The capacity provisioning tasks 332 may have associated goal states. A task may be complete once the task reaches its goal state. The capacity provisioning tasks 332 may generate events 342a as the capacity provisioning tasks 332 progress toward their goal states. The events 342a may contain information about the capacity provisioning tasks 332 and statuses of the capacity provisioning tasks 332. The capacity provisioning tasks 332 may provide the events 342a to each other. For example, task 332a may provide a first event to task 332b. The tasks 332 may provide the events 342a to the event driven orchestration system 336. The event driven orchestration system 336 may generate or update execution graphs for jobs based on the events 342a. The capacity provisioning tasks 332 may push the events 342a to each other and to the event driven orchestration system 336 according to one or more data contracts 350. The data contracts 350 may define a schema for the events 342a.

The data collection/aggregation system 334 may collect, format, and aggregate information and data from multiple sources. The data collection/aggregation system 334 store collected information in data store 338.

The data collection/aggregation system 334 may include an event collection module 360. The event collection module 360 may receive one or more of the events 342a from the event driven orchestration system 336. In the alternative, the event collection module 360 may receive one or more of the events 342a from the capacity provisioning tasks 332. In the alternative, the event collection module 360 may receive one or more of the events 342a from a message queue. The event collection module 360 may receive one or more of the events 342a according to the data contracts 350. The event collection module 360 may persist one or more of the events 342a to the data store as events 342b.

The data collection/aggregation system 334 may include a health signal collection module 358. The health signal collection module 358 may receive information or data from external systems 314. The external systems 314 may be systems that support a cloud-computing system. The external systems 314 may be within the cloud-computing system but external to the data collection/aggregation system 334. The external systems 314 may be external to the cloud-computing system.

The external systems 314 may generate health signals 346a. The health signals 346a may include information about a health state of the external systems 314. For example, the health signals 346a may indicate whether a particular system included in the external systems 314 is functioning. The external systems 314 may generate health signals 346a periodically or upon a change in a health state of a system. The external systems 314 may provide one or more of the health signals 346a to the health signal collection module 358. The external systems 314 may provide the health signals 346a according to a common schema outlined in the data contracts 350. The health signal collection module 358 may persist one or more of the health signals 346a to the data store as health signals 346b.

The data collection/aggregation system 334 may include a structured tag collection module 356. The ticket management system 312 may include and receive tags 340a. Users may generate the tags 340a according to a common schema. The tags 340a may include information about tickets previously generated by the ticket management system 312. For example, the tags 340a may categorize an issue identified in a ticket. Users may generate the tags 340a in response to the ticket management system 312 generating a ticket. The structured tag collection module 356 may pull one or more of the tags 340a from the ticket management system 312. The structured tag collection module 356 may persist one or more of the tags 340a to the data store 338 as tags 340b.

The data collection/aggregation system 334 may include a metadata collection module 354. The external systems 314 may include data stores 344. The data stores 344 may include metadata regarding the external systems 314 and the health signals 346a. The metadata collection module 354 may query the data stores 344. The metadata collection module 354 may receive metadata in response to querying the data stores 344. The metadata collection module 354 may persist the metadata to the data store 338. The metadata collection module 354 may query the data stores 344 in response to the health signal collection module 358 receiving one or more of the health signals 346a. For example, the health signal collection module 358 may receive a first health signal from the external systems 314. The first health signal may indicate that a first node is offline. In response to the health signal collection module 358 receiving the first health signal, the metadata collection module 354 may query the data stores 344 for metadata regarding the first node and the first health signal. The metadata may include additional information about the first node and about the reasons it is offline.

The data collection/aggregation system 334 may include an RCA collection module 352. A cloud-computing system may store root-cause records 348*a* in an RCA store 330. The RCA collection module 352 may pull one or more of the root-cause records 348*a* from the RCA store 330. The RCA collection module 352 may persist one or more of the root-cause records 348*a* to the data store 338 as root-cause records 348*b*. The root-cause records 348*a* may identify a root cause of an issue. The issue may be identified in one or more tickets. The root-cause records 348*a* may also indicate repairs necessary to resolve the issue. The root-cause records 348*a* may identify one or more teams responsible for the repairs.

A ticket may be linked to a root-cause record. A root-cause record may be linked or associated with one or more tickets. For example, there may be a bug in software that formats hard drives. The hard drives may be included in servers that are in the process of being installed across multiple data centers throughout the world. A fix may be in the process of rolling out but may have made it to only a limited number of data centers. The cloud-computing system may start seeing failures in five to ten data centers. Rather than have operations flooded with incidents because there are dozens of capacity provisioning jobs being done in parallel, an RCA system may have linked the incidents to a single root cause. That way the operations could see that all the incidents are related to a single root cause. There will be multiple incidents because the failures occur in different locations in different regions and different control planes. Maintaining the multiple incidents allow the cloud-computing system and operations to assess the overall impact of the bug.

Figure 4:
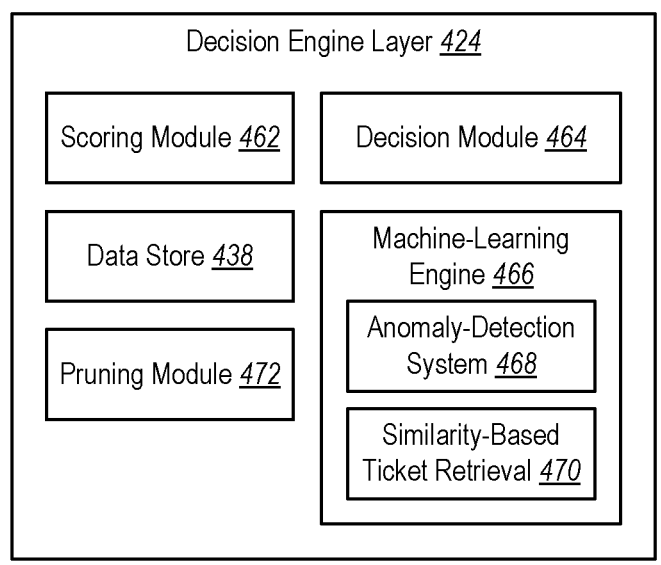
FIG. 4 illustrates an example decision engine layer of a root-cause analysis system.

FIG. 4 illustrates an example decision engine layer 424. The decision engine layer 424 may include a pruning module 472, a scoring module 462, a data store 438, a decision module 464, and a machine-learning engine 466.

The decision engine layer 424 may receive a ticket from a ticket management system. The ticket may identify an incident. The incident may be a problem or a failure encountered in attempting to complete a capacity provisioning job. The decision engine layer 424 may attempt to automatically determine a root cause of the incident. Automatically identifying the root cause of the incident may expedite repairs.

To determine a root cause of an incident identified in a current ticket the decision engine layer 424 may attempt to find previous tickets (which may be referred to as historical tickets or archived tickets) similar to the current ticket. The previous tickets may include tickets that are active as well as tickets that have not yet been mitigated, resolved, or closed. The data store 438 may include archived tickets that a ticket management system has previously issued. One or more of the archived tickets may be linked to one or more root-cause records. A root-cause record may identify a root cause of a ticket. A root-cause record may identify necessary repairs for a ticket. A single ticket may be linked to a single root-cause record. A single root-cause record may be linked to multiple tickets.

The decision engine layer 424 may use any available matching algorithm to identify previous tickets that are similar to the current ticket. For example, the decision engine layer 424 may identify previous tickets that have a same title as the current ticket. As another example, the decision engine layer 424 may identify previous tickets that have a matching hardware type where an incident occurred. As another example, the decision engine layer 424 may determine a cosine value for how close the current ticket is to previous tickets and determine that a previous ticket is similar if the cosine value is above a threshold.

As another example, the decision engine layer 424 may use a machine-learning engine 466 to identify previous tickets similar to the current ticket.

The machine-learning engine 466 may include an anomaly-detection system 468. The anomaly-detection system 468 may use historical execution time for each task in an execution graph to complete based on a SKU being provisioned. The anomaly-detection system 468 may use this execution time series to detect anomalies by decomposing the data into its trend, the seasonal components, and the residuals. The resultant anomalies may be reflected based on the anomaly detection threshold chosen based on domain knowledge of the data.

The machine-learning engine 466 may include a similarity-based ticket retrieval 470. The similarity-based ticket retrieval 470 may use unstructured data from stack logs, structured data, and domain-specific features that impact total time to mitigate the ticket. This may result in bringing in historical tickets that have associated root causes and repair details on how the historical tickets were resolved with high confidence that the root cause and the repair details can be used by the on-call engineer to resolve the issue identified in the current ticket.

The machine-learning engine 466 may also include custom heuristics, be regex based, be rule based, include text analytics, or include natural language processing. The machine-learning engine 466 may use any of these techniques (or any other machine-learning technique known in the art) for identifying historical tickets that are similar to the current ticket. The historical tickets that the machine-learning engine 466 identifies may have associated root causes and repairs that may include a root cause and repairs for the current ticket.

The decision engine layer 424 may use previous tickets (if any) that the decision engine layer 424 determined to be similar to the current ticket to identify potential root causes of the current ticket. The decision engine layer 424 may create a list of all root causes associated with the previous tickets that the decision engine layer 424 determined to be similar to the current ticket. The list may be a list of possible root causes for the current ticket. The decision engine layer 424 may prune the list of possible root causes using the pruning module 472. The decision engine layer 424 may use the scoring module 462 to score each root cause on the list of possible root causes. The score assigned to each root cause on the list of possible root causes may be based in part on whether the root cause has known repairs associated with it. The scoring module 462 may access information contained in the data store 438 and pull information from external systems to score each root cause on the list of possible root causes. The decision engine layer 424 may use the scoring module 462 to score each root-cause record (which may or may not identify necessary repairs for a root cause) associated with the list of possible root causes. The scoring module 462 may access information contained in the data store 438 and pull information from external systems to score each root-cause record associated with the list of possible root causes.

The decision engine layer 424 may use the decision module 464 to determine whether the list of possible root causes includes a root cause of the current ticket. If no possible root cause receives a score above a minimum threshold (which may occur if the list of possible root causes is empty), the decision engine layer 424 may determine that the decision engine layer 424 cannot determine a root cause of the current ticket without human intervention. In this case, the decision engine layer 424 may provide the current ticket to operations for a human to determine a root cause of the current ticket and needed repairs.

If the decision engine layer 424 identifies a root cause with a score above a high threshold, the decision engine layer 424 may determine that the root cause should be associated with the current ticket. The decision engine layer 424 may determine that repairs for the current ticket are known. The repairs may be described in a root-cause record that identifies the root cause. The decision engine layer 424 may identify the responsible team(s) and notify the responsible team(s) of the repairs.

If the decision engine layer 424 identifies a root cause with a score below the high threshold but above the minimum threshold, the decision engine layer 424 may determine that repairs for the current ticket are known but that a root cause of the current ticket does not currently exist. For example, the decision engine layer 424 may determine that repairs identified in a root-cause record can be used to resolve the current ticket but that a root cause identified in the root-cause record is not a valid root cause for the current ticket. The decision engine layer 424 may use information stored in the data store 438 to generate a root cause of the current ticket. If the decision engine layer 424 determines that it cannot generate a root cause for the current ticket, the decision engine layer 424 may seek assistance from operations to determine the root cause.

If the decision engine layer 424 identifies a root cause with a score below the high threshold but above the minimum threshold, the decision engine layer 424 may determine that a root cause of the current ticket is known but repairs are unknown. In that case, the decision engine layer 424 may provide the current ticket and the root cause to operations for a human to determine the repairs. For example, the decision engine layer 424 may identify a matching ticket for the current ticket. The matching ticket may be associated with a root-cause record. The root-cause record may identify a root cause of the matching ticket but may not identify necessary repairs for the root cause of the matching ticket.

Figure 5:
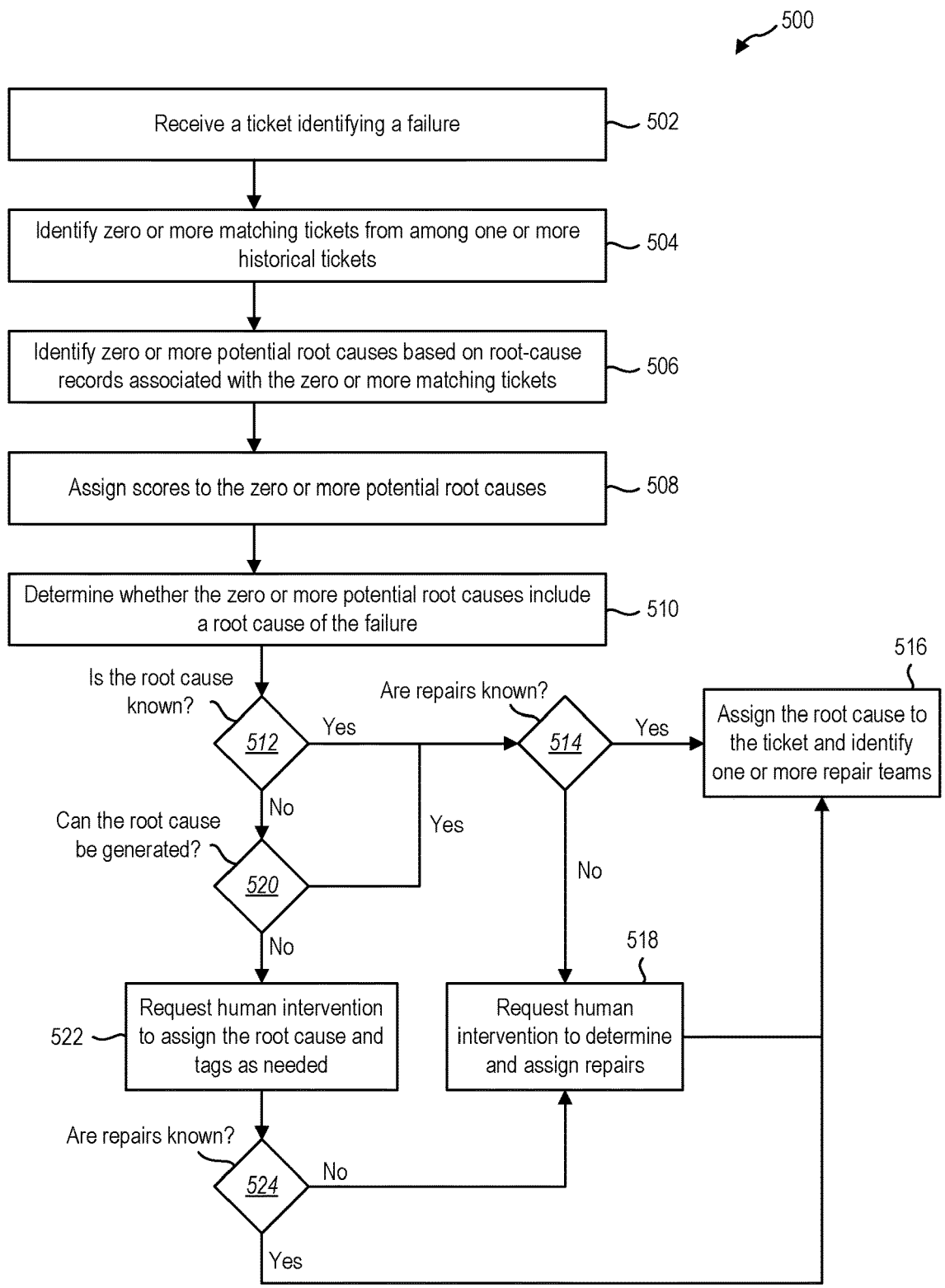
FIG. 5 illustrates an example method for determining a root cause of a failure.

FIG. 5 illustrates an example method 500 for determining a root cause of a failure.

The method 500 may include receiving 502 a ticket identifying a failure.

The method 500 may include identifying 504 zero or more matching tickets from among one or more historical tickets. The zero or more matching tickets may be similar to the ticket. Identifying 504 the zero or more matching tickets may be done using a machine-learning engine.

The method 500 may include identifying 506 zero or more potential root causes based on root-cause records associated with the zero or more matching tickets. Each of the zero or more matching tickets may be linked to one root-cause record. A ticket may have only one root cause. A ticket may require multiple repair items owned by one or more teams.

The method 500 may include assigning 508 scores to the zero or more potential root causes. Assigning 508 the scores to the zero or more potential root causes may include determining the scores based on data stored in a data store. The data stored in the data store may include events, health signals, metadata for external systems, root-cause records, and tags.

The method 500 may include determining 510 whether the zero or more potential root causes include a root cause of the failure. Determining 510 whether the zero or more potential root causes include the root cause of the failure may be based on the scores.

The method 500 may include determining 512 whether the root cause is known. Determining 512 whether the root cause is known may include determining whether the one or more historical tickets includes a matching ticket sufficiently similar to the ticket, determining whether the matching ticket has an associated root-cause record identifying a root cause of the matching ticket, and determining whether the root cause of the matching ticket is a valid root cause of the ticket based on the data stored in the data store.

If the root cause is known, the method 500 may include determining 514 whether repairs are known. Determining 514 whether repairs are known may include determining whether the associated root-cause record identifies the repairs.

If the repairs are known, the method 500 may include assigning 516 the root cause to the ticket and identifying one or more repair teams for the repairs.

If the repairs are not known, the method 500 may include requesting 518 human intervention to determine and assign repairs. The method 500 may also include assigning 516 the root cause to the ticket and identifying one or more repair teams for the repairs.

If the root cause is not known, the method 500 may include determining 520 whether the root cause can be generated. Determining 520 whether the root cause can be generated may include attempting to generate the root cause based on the data in the data store.

If the root cause can be generated, the method 500 may include determining 514 whether repairs are known.

If the root cause cannot be generated, the method 500 may include requesting 522 human intervention to assign the root cause and tags as needed and determining 524, whether repairs are known.

If the repairs are known, the method 500 may include assigning 516 the root cause to the ticket and identifying one or more repair teams for the repairs.

If the repairs are not known, the method 500 may include requesting 518 human intervention to determine and assign the repairs.

Figure 6:
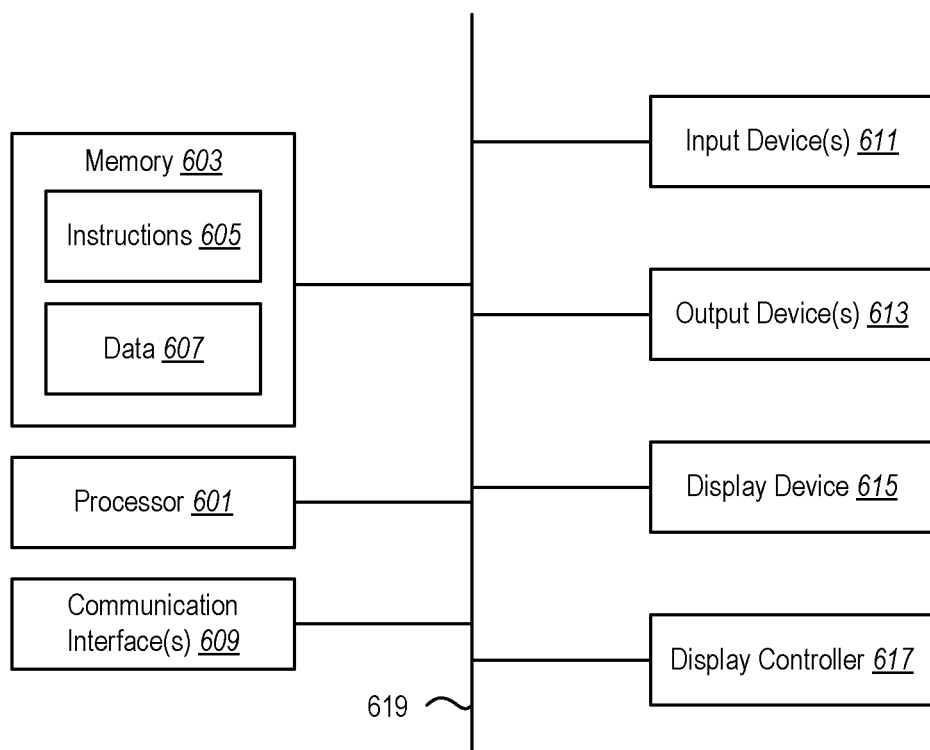
FIG. 6 illustrates certain components that can be included within a computing device.

Reference is now made to FIG. 6. One or more computing devices 600 can be used to implement at least some aspects of the techniques disclosed herein. FIG. 6 illustrates certain components that can be included within a computing device 600.

The computing device 600 includes a processor 601 and memory 603 in electronic communication with the processor 601. Instructions 605 and data 607 can be stored in the memory 603. The instructions 605 can be executable by the processor 601 to implement some or all of the methods, steps, operations, actions, or other functionality that is disclosed herein. Executing the instructions 605 can involve the use of the data 607 that is stored in the memory 603. Unless otherwise specified, any of the various examples of modules and components described herein can be implemented, partially or wholly, as instructions 605 stored in memory 603 and executed by the processor 601. Any of the various examples of data described herein can be among the data 607 that is stored in memory 603 and used during execution of the instructions 605 by the processor 601.

Although just a single processor 601 is shown in the computing device 600 of FIG. 6, in an alternative configuration, a combination of processors (e.g., an Advanced RISC (Reduced Instruction Set Computer) Machine (ARM) and a digital signal processor (DSP)) could be used.

The computing device 600 can also include one or more communication interfaces 609 for communicating with other electronic devices. The communication interface(s) 609 can be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The computing device 600 can also include one or more input devices 611 and one or more output devices 613. Some examples of input devices 611 include a keyboard, mouse, microphone, remote control device, button, joystick, trackball, touchpad, and lightpen. One specific type of output device 613 that is typically included in a computing device 600 is a display device 615. Display devices 615 used with embodiments disclosed herein can utilize any suitable image projection technology, such as liquid crystal display (LCD), light-emitting diode (LED), gas plasma, electroluminescence, wearable display, or the like. A display controller 617 can also be provided, for converting data 607 stored in the memory 603 into text, graphics, and/or moving images (as appropriate) shown on the display device 615. The computing device 600 can also include other types of output devices 613, such as a speaker, a printer, etc.

The various components of the computing device 600 can be coupled together by one or more buses, which can include a power bus, a control signal bus, a status signal bus, a data bus, etc. For the sake of clarity, the various buses are illustrated in FIG. 6 as a bus system 619.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, various types of storage class memory, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system for automatically determining a root cause of a failure associated with a capacity provisioning process in a cloud-computing system, the system comprising:
   one or more processors;
   memory in electronic communication with the one or more processors;
   a data store, wherein the data store includes historical tickets and root-cause records associated with one or more of the historical tickets; and
   instructions stored in the memory, the instructions being executable by the one or more processors to:
   receive events emitted by tasks associated with the capacity provisioning process, wherein the events describe a status of the tasks;
   receive health signals from one or more external systems, wherein the health signals indicate whether the one or more external systems are operational;
   receive a ticket, wherein the ticket identifies the failure associated with the capacity provisioning process;
   determine the root cause of the failure based on the events, the health signals, the historical tickets, and the root-cause records, wherein determining the root cause of the failure comprises pattern-matching the ticket against the historical tickets and analyzing an execution graph that indicates an execution order of tasks included in the capacity provisioning process, dependencies among the tasks, and dependencies of the tasks on cloud-computing subsystems;
associate the root cause of the failure with the ticket; and
provide the root cause of the failure to operations.

2. The system of claim 1, wherein the instructions to determine the root cause of the failure based on the events, the health signals, the historical tickets, and the root-cause records comprise instructions executable by the one or more processors to:
identify a matching ticket among the historical tickets, wherein the matching ticket has one or more similarities to the ticket;
identify a root-cause record associated with the matching ticket, wherein the root-cause record associated with the matching ticket identifies a root cause of the matching ticket; and
determine the root cause of the failure based in part on the root-cause record associated with the matching ticket.

3. The system of claim 2, wherein the instructions are further executable by the one or more processors to:
identify additional matching tickets among the historical tickets, wherein the additional matching tickets have one or more similarities to the ticket;
identify one or more root-cause records associated with the additional matching tickets, wherein the one or more root cause records associated with the additional matching tickets identify root causes for the additional matching tickets; and
prune the one or more root-cause records based on time and spatial correlation.

4. The system of claim 2, wherein the instructions to identify the matching ticket among the historical tickets comprise instructions executable by the one or more processors to identify the matching ticket among the historical tickets using a machine-learning engine.

5. The system of claim 2, wherein the instructions are further executable by the one or more processors to:
determine repairs for the failure based on the root-cause record associated with the matching ticket;
identify one or more repair teams for the repairs; and
provide the root cause of the failure and the repairs to the one or more repair teams.

6. The system of claim 5, wherein the instructions are further executable by the one or more processors to:
prioritize the repairs versus other repairs associated with the cloud-computing system.

7. The system of claim 1, wherein the instructions are further executable by the one or more processors to:
determine that the root-cause records do not contain the root cause of the failure;
generate the root cause of the failure based on the events or the health signals; and
store the root cause of the failure in the data store.

8. The system of claim 7, wherein the instructions are further executable by the one or more processors to:
collect tags associated with one or more of the historical tickets, wherein a tag comprises information about a root cause of a historical ticket and was entered according to a defined schema and wherein generating the root cause of the failure is based in part on the tags.

9. The system of claim 1, wherein the events emitted by the tasks associated with the capacity provisioning process for the cloud-computing system and the health signals from the one or more external systems are received according to a data contract.

10. The system of claim 1, wherein the instructions are further executable by the one or more processors to:
store the events on the data store; and
store the health signals on the data store.

11. The system of claim 1, wherein the instructions are further executable by the one or more processors to:
display the execution graph for the capacity provisioning process on a presentation system; and
display the root cause of the failure on the presentation system.

12. The system of claim 1, wherein the instructions are further executable by the one or more processors to:
query the external systems for metadata in response to receiving the health signals; and
store the metadata on the data store.

13. A method executed by a computing device for automatically determining a root cause of a failure associated with a capacity provisioning process, wherein the capacity provisioning process is for a cloud-computing system, the method comprising:
receiving a ticket, the ticket indicating the failure;
identifying zero or more potential root causes of the failure, wherein the zero or more potential root causes are described in root-cause records associated with one or more historical tickets and execution graphs of capacity provisioning processes that indicate an execution order of tasks included in the capacity provisioning process, dependencies among the tasks, and dependencies of the tasks on cloud-computing subsystems;
assigning scores to the zero or more potential root causes of the failure;
determining whether the zero or more potential root causes include the root cause based on the scores;
determining, if the zero or more potential root causes do not include the root cause of the failure, whether the root cause of the failure can be generated without human intervention;
determining whether repairs for the failure are known based on the root-cause records associated with the one or more historical tickets;
seeking human intervention if either the root cause or the repairs are unknown;
attaching, if the root cause is known, the root cause to the ticket; and
identifying, if the repairs are known, one or more repair teams to complete the repairs.

14. The method of claim 13 further comprising generating the root cause of the failure based on events received from tasks associated with the capacity provisioning process, health signals received from external systems that support the cloud-computing system, and tags associated with the historical tickets.

15. The method of claim 13, wherein the one or more historical tickets are included in a set of historical tickets and identifying the zero or more potential root causes for the failure comprises:
identifying the one or more historical tickets based on comparing the ticket to the set of historical tickets; and
identifying the root-cause records associated with the one or more historical tickets.

16. The method of claim 15, wherein identifying the one or more historical tickets based on comparing the ticket to the set of historical tickets comprises identifying the one or more historical tickets based on performing a similarity analysis between the ticket and the set of historical tickets.

17. The method of claim 15, wherein identifying the one or more historical tickets based on comparing the ticket to the set of historical tickets comprises identifying the one or more historical tickets from among the set of historical tickets using a machine-learning engine.

18. The method of claim 13, wherein the scores assigned to the zero or more potential root causes for the failure are based on events received from tasks associated with the capacity provisioning process, health signals received from external systems that support the cloud-computing system, and tags associated with the historical tickets.

19. A non-transitory computer-readable medium comprising instructions that are executable by one or more processors to cause a computing system to:
receive events emitted by tasks associated with a capacity provisioning process for a cloud-computing system, wherein the events describe a status of the tasks;
receive health signals from one or more external systems, wherein the health signals indicate whether the one or more external systems are operational;
receive a ticket, wherein the ticket identifies a failure associated with the capacity provisioning process;
access a data store storing historical tickets of the cloud-computing system, wherein one or more of the historical tickets have associated root-cause records;
determine a root cause of the failure based on the events, the health signals, the historical tickets, and the associated root-cause records, wherein determining the root cause of the failure comprises pattern-matching the ticket against the historical tickets and analyzing an execution graph that indicates an execution order of tasks included in the capacity provisioning process, dependencies among the tasks, and dependencies of the tasks on cloud-computing subsystems;
determine necessary repairs for the failure based on the associated root-cause records; and
determine an estimated time for the necessary repairs to be complete.

20. The non-transitory computer-readable medium of claim 19 further comprising instructions that are executable by the one or more processors to cause the computing system to:
perform the necessary repairs.

* * * * *